United States Patent
Ahlqvist et al.

(10) Patent No.: US 11,609,782 B2
(45) Date of Patent: Mar. 21, 2023

(54) DELAYED PROCESSING FOR ELECTRONIC DATA MESSAGES IN A DISTRIBUTED COMPUTER SYSTEM

(71) Applicant: Nasdaq Technology AB, Stockholm (SE)

(72) Inventors: Carl Ahlqvist, Stockholm (SE); Ulf Ahlenius, Bromma (SE); Robert Brouwer, London (GB); Johan Norén, Stockholm (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 563 days.

(21) Appl. No.: 16/709,571

(22) Filed: Dec. 10, 2019

(65) Prior Publication Data

US 2020/0201670 A1 Jun. 25, 2020

Related U.S. Application Data

(60) Provisional application No. 62/783,330, filed on Dec. 21, 2018.

(51) Int. Cl.

| | | |
|---|---|---|
| *G06F 9/00* | (2006.01) | |
| *G06F 9/46* | (2006.01) | |
| *G06F 16/23* | (2019.01) | |
| *G06F 9/54* | (2006.01) | |
| *G06Q 40/04* | (2012.01) | |
| *G06F 16/2455* | (2019.01) | |

(52) U.S. Cl.
CPC .............. *G06F 9/466* (2013.01); *G06F 9/546* (2013.01); *G06F 16/2343* (2019.01); *G06F 16/24558* (2019.01); *G06Q 40/04* (2013.01)

(58) Field of Classification Search
None
See application file for complete search history.

(56) References Cited

U.S. PATENT DOCUMENTS

| | | |
|---|---|---|
| 8,005,745 B1 | 8/2011 | Cleaves et al. |
| 10,127,615 B1 | 11/2018 | Givot |
| 2005/0091142 A1 | 4/2005 | Renton et al. |
| 2006/0020536 A1 | 1/2006 | Renton et al. |

(Continued)

FOREIGN PATENT DOCUMENTS

| | | | | |
|---|---|---|---|---|
| CA | 2227431 C | * | 5/2001 | ....... G06F 17/30212 |
| EP | 3131049 | | 2/2017 | |

(Continued)

OTHER PUBLICATIONS

International Search Report for International Application No. PCT/SE2019/051325, five pages, dated Mar. 12, 2020.

(Continued)

*Primary Examiner* — Tuankhanh D Phan
(74) *Attorney, Agent, or Firm* — Nixon & Vanderhye P.C.

(57) ABSTRACT

A computer system is provided that includes a matching engine and a freezing process. The matching engine freezes one side of a two-sided data structure when an order is determined to matchable. The freezing process starts a timer based on the matching determination. Orders that are handled by the matching engine while the side is frozen are added to a queue. When the timer ends, the orders in the queue are processed against those orders that are now resting within the data structure.

20 Claims, 6 Drawing Sheets

(56) References Cited

U.S. PATENT DOCUMENTS

2011/0276396 A1* 11/2011 Rathod .................. G06Q 20/10
707/706
2017/0004563 A1 1/2017 Noviello et al.

FOREIGN PATENT DOCUMENTS

WO 2010/085746 7/2010
WO WO-2010085746 A1 * 7/2010 ............. G06Q 40/04

OTHER PUBLICATIONS

Written Opinion of the ISA for International Application No. PCT/SE2019/051325, nine pages, dated Mar. 12, 2020.

* cited by examiner

DELAYED PROCESSING FOR ELECTRONIC DATA MESSAGES IN A DISTRIBUTED COMPUTER SYSTEM

CROSS REFERENCE(S) TO RELATED APPLICATION(S)

This application claims priority to U.S. provisional Application No. 62/783,330, filed Dec. 21, 2018, the entire contents of which are hereby incorporated by reference.

TECHNICAL OVERVIEW

The technology described herein relates to receiving and processing electronic data messages in a distributed computer system. More particularly, the technology described herein relates to delaying, freezing, or locking a matching process (e.g., for one side of the matching process) when an incoming data transaction request (e.g., an order) is eligible to be matched.

INTRODUCTION

Distributed computing technology relates to networking multiple different computer systems together to allow the distributed system to handle one or more computational problems faster than a single system. For example, rather than have 1 computer answer a question in 100 years, 1000 computers (or 1000 processes working on 1000 different computers) can work to answer that same question in a month or two. Similarly, rather than one computer handling 1000 requests (for example, ordering books online), many computers can be programmed to handle (e.g., receive and process) such requests simultaneously.

Distributed computing is thus relevant in many different areas of data processing where large amounts of data are continually fed into a distributed system for processing. For example, traffic information, weather information, operating systems, internet commerce applications, and other real-time data processes can benefit from distributed computing techniques.

Distributed computing is also used in providing electronic exchange or matching computing systems. Different nodes of such a system can include computing nodes that submit orders and those that process and/or match submitted orders.

One issue with distributed systems is how the distance or latency between different computer nodes can factor into how the distributed system operates. For example, two client nodes may submit two different data transaction requests, but if one client is "closer" to the node that processes such requests then its request may be processed first—even if the second request was transmitted from the second client node before of the first request was transmitted.

Techniques that may address such technical problems (e.g., relative latency) in distributed systems are thus continually sought after.

SUMMARY

In certain example embodiments, a computer system is provided that receives and processes data transaction requests. Processing such requests may include matching (e.g., via a matching engine) contra-sided requests to one another. Data transaction requests can include orders.

In certain examples, a matching engine of a computer system may be configured to lock or freeze one side of a data structure (e.g., an order book) that holds data transaction requests. When a side is first locked, a timer is started. Data transaction requests for a given side are queued while the given side of the data structure is locked/frozen. Upon expiration of a timer, the matching engine may unlock or unfreeze the locked side of the data structure and process any data transaction requests that have been queued in the meantime. In certain examples, the timer is maintained by a separate timer or freeze process that is separate from the matching engine. Messages may be communicated between the different processes (e.g., the matching engine and the freeze process) to lock and/or unlock a given data structure from being operated on.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
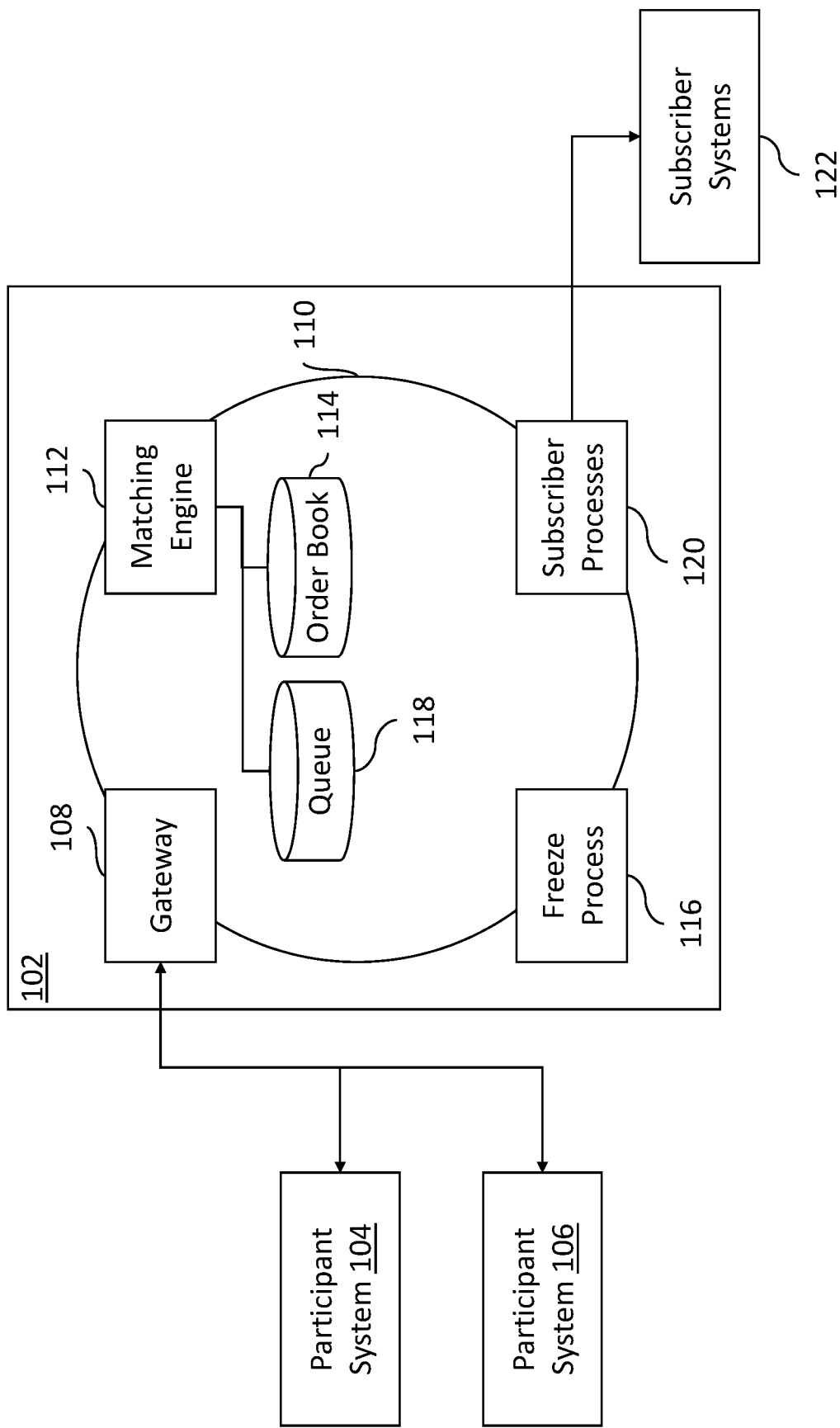
FIG. 1 is a block diagram of example computer systems that are used for receiving and processing electronic data messages according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system is provided that includes a matching engine that determines whether newly received data transaction requests (e.g., orders) are matchable against one or more contra-sided data transaction requests (e.g., that are pending or resting). If there is a potential match, then the newly received data transaction request is added to a queue that delays the execution (e.g., matching) of the data transaction request against other data transaction requests.

In certain examples, the delay in processing the newly received data transaction requests may allow for the parameters of the contra-sided data transaction requests to be adjusted (e.g., to allow for re-quoting of an order). This may allow participants with relatively slower electronic data connections to the computer system that handles the matching to still react to external changes.

In certain examples, the addition of newly received orders to a queue that delays their processing may effectively "freeze" one side of an order book (e.g., a data structure) while still allowing the other side of the order book to continue operating (e.g., to allow orders to be modified, to match against contra-sided orders, etc. . . . ).

In certain example embodiments, a matching engine is programmed to execute a one-sided order book freeze when handling incoming aggressive orders (e.g., incoming orders that can match immediately). During a configurable freeze or lock time, orders on the other, non-frozen, side of the order book can be modified or otherwise be processed (e.g., by matching), while orders on the on the frozen side of the order book are queued until that side becomes un-frozen.

When a side of an order book is frozen or otherwise locked, a timer is triggered that runs for a period of time. Upon expiration of the timer, the matching engine unfreezes the corresponding frozen side of the order book. Any subsequent orders on the same side of the order book that are received while the timer is active (or while that side of the order book is still frozen) will be stored in a queue along with the initial order that caused the freeze. Upon expiration of the timer, the orders in the queue are processed in the order that they were inserted.

In many places in this document, software modules (also called engines or processes) and actions performed by such modules are described. This is done for ease of description; it should be understood that, whenever it is described in this document that a software module performs any action, the action is in actuality performed by underlying hardware elements (such as a hardware processor and a memory device) according to the instructions that comprise the software module. Further details regarding this are provided below in, among other places, the description of FIG. 4.

Description of FIG. 1

FIG. 1 is a block diagram of an example system that includes computer system 102, participant system 104, participant system 106, and subscriber systems 122. The system shown in FIG. 1 may be a distributed computer system in certain example embodiments that comprises computer system 102, participant system 104, participant system 106, and/or subscriber systems 122. For example, participant systems 104 and 106 may be considered client nodes within such a distributed computer system and computer system 102 may be a processing node that acts on requests from such client nodes.

Computer system 102 may be a computer system that is programmed to match or otherwise process data transaction requests. Data transaction requests are also called orders herein (or include details for an order or requests to act upon, change, modify, or cancel existing orders). Data transaction requests are communicated using electronic data messages between the systems and components described herein. In certain examples, computer system 102 may be an automated electronic exchange computer system.

Figure 4:
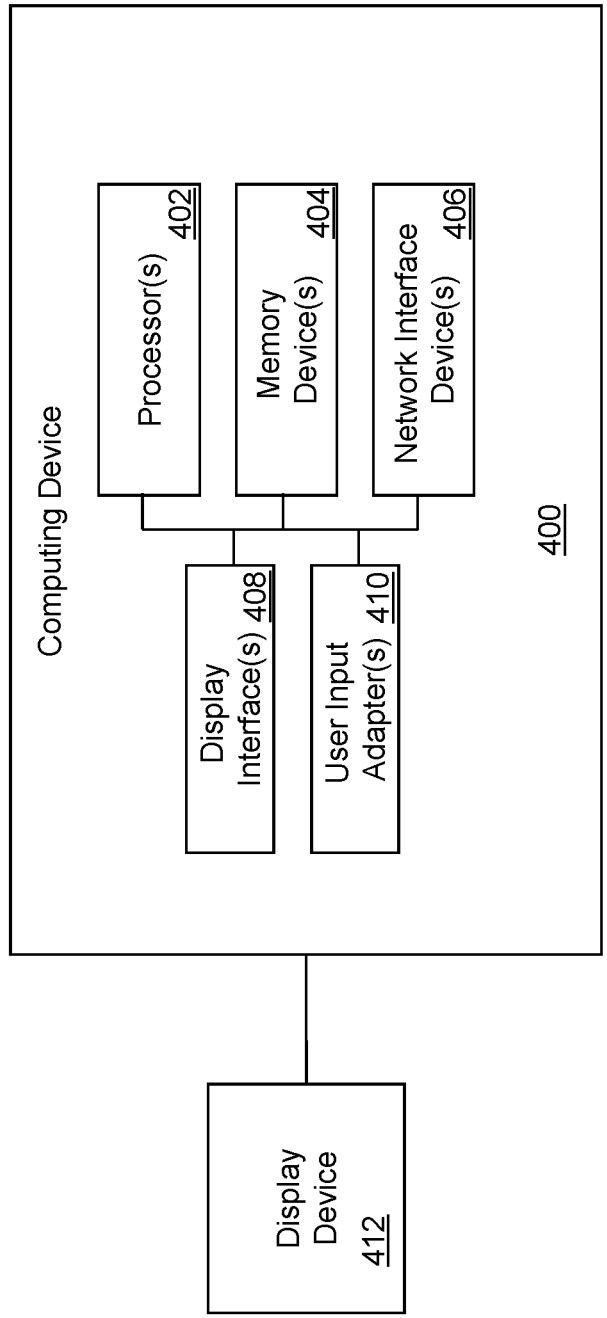
FIG. 4 shows an example computing device that may be used in some embodiments to implement features described herein.

Computer system 102 includes one or more computing devices (as shown in FIG. 4). In certain examples, multiple different computers (e.g., computer nodes) are provided to makeup computer system 102. Thus, computer system 102 may also be a distributed computer system in which different computing nodes of the system communicate with one another. In other words, multiple instances of the computer device in FIG. 4 may provide the functionality provided by computer system 102.

The components of computer system 102 may include gateway 108, matching engine 112, freeze process 116, subscriber processes 120, and a messaging bus 110. Computer system 102 may also include components that are data structures or data stores, such as order book 114 and queue 118. These data structures may store data transaction requests (or information associated with such requests). In certain examples, each component of system 102 may be provided on a separate computing node of the system 102.

In certain examples, computer system 102 may also include a sequencer process that is configured to logically sequence messages that are communicated over the messaging bus 110 and between components (e.g., gateway 108, matching engine 112, freeze process 116, subscriber process 120, a sequence process, etc. . . . ) of computer system 102. In certain examples, the matching engine 112 includes the sequencer process (e.g., the matching engine is both a sequencer and a matcher). Other systems and/or components may be included with computer system 102 to handle reception, processing, and post-processing for data transaction requests.

Participant computer systems 104 and 106 can include personal computers, mobile devices, automated computer systems, and the like. Generally, participant computer systems 104 and 106 can include any computer system (such as the computer system shown in FIG. 4) programmed to interface with computer system 102 (or components associated therewith) for the purpose of submitting electronic data messages, data transaction requests, and/or orders.

In certain examples, participant computer systems 104 and/or 106 are co-located with computer system 102. For example, at least one of participant computer systems 104 and 106 may be located in the same data center or even within the same rack of computers as computer system 102. Physically locating participant computer systems close to computer system 102 may facilitate lower latency connections between the two systems. Accordingly, the amount of time that it takes to submit a data transaction request from a participant system to the computer system 102 may vary based on the connection latency between the two computer systems. For example, the amount of time participant system 104 needs to submit (e.g., the transmission time between 104 and 102) a data transaction request to computer system 102 may be 1 ms. In contrast, the amount of time participant system 106 needs to submit a data transaction request to computer system 102 may be 0.5 ms.

Participant systems submit data transaction requests that are received by gateway 108. In certain examples, there are multiple instances of gateway 108 that each correspond to a different participant that communicates with computer system 102. In certain examples, each instance may be a different "port" of the gateway 108 through which participants communicate with computer system 102.

In certain examples, gateway 108 is implemented using one or more of network interface devices 506. Gateway 108 may be configured to perform validations on newly received data transaction requests. This may include, for example, validating that the fields or other parameters for the submitted data transaction request are valid. For example, that the fields are valid for a given order type or the like. In certain examples, the port for a given participant may be programmed with additional validation tasks for that specific participant. In certain example embodiments, gateway 108 may be a FIX gateway that implements and uses the Financial Information eXchange (FIX) communications protocol.

In certain examples, multiple different validation processing may be performed for each incoming data transaction request. The processing for such validations may be split to be performed before and after the order/data transaction request is added to queue 118 (e.g., at 208). Validation processing may include, for example, 1) transaction integrity processing (e.g., validation that every field in the incoming data transaction request is correctly filled in), 2) user validation processing (e.g., validation that the user is authorized to trade the instrument, which may include trade-on-behalf validations), 3) pre-trade risk validation (e.g., risk credit is consumed by the incoming order), 4) price limit processing, 5) Self-Match prevention processing, and/or 6) circuit breaker processing.

In certain example embodiments, processing performed on the data transaction request prior to it being added to queue 118 may include: 1) the transaction integrity processing, 2) the user validation processing, 3) the pre-trade risk validation processing, and/or 4) the price limit processing.

In certain example embodiments, processing performed on a data transaction request after the queue 118 (e.g., after the request is processed upon removal from queue 118) may include: 1) the user validation processing, 2) the price limit processing, 3) the self-match prevention processing, and/or 4) the circuit breaker processing.

In certain examples, the gateway 108 may also handle communicating acknowledgements or confirmations back to participant computer systems. Gateway 108 may communicate with other components of computer system 102 via communication bus 110 (which may include having a sequencer sequence the message that is being delivered via the communication bus 110). In certain examples, each instance of gateway 108 may be hosted in its own virtual container or virtual machine and multiple instances of gateway 108 may be hosted on the same computing node of computing system 102.

Matching engine 112 may be a software module or service configured to receive (or listen for) data transaction requests communicated across the messaging bus 110 of the computer system 102. In certain examples, there is a different instance of matching engine 112 for each of the plurality of different resources (e.g., different stocks, instruments, bonds, or other securities) that are matchable using computer system 102. For example, if 1000 different resources are matchable then there may be 1000 different matching engine instances that are running on computer system 102—with each having a separate order book 114 that the respective matching engine 112 instance operates on. Each instance may be provided in a separate virtual container or machine, or provided on a separate computing node of computer system 102. Each instance may also include at least two queues 118 that are used for the respective sides of the corresponding order book 114.

Data transaction requests received by the matching engine 112 may be those that contain requests for a new order, to modify an existing order, to cancel an existing order, etc. In the case of a new order, the matching engine 112 may attempt to determine if there are any contra-sided data transaction requests that are stored in the order book 114 that are eligible to match against the newly received data transaction request.

In certain examples, matching engine 112 may be configured to handle incoming aggressive orders (e.g., incoming orders that can immediately match against a contra-side order that is already resting in the order book) by freezing the side of the order book that the aggressive order is on. In certain examples, even though a first side of the order book is frozen, orders may still be processed that are on the other side. For example, an order on side X may cause side X to freeze. But while side X of the order book 114 is frozen an order on side Y may be modified or otherwise processed. However, an order on side Y may cause side Y to be frozen as well. In certain examples, only one side of the order book may be frozen at a time. In certain examples, both sides of the order book may be frozen.

Order book 114 may be a data structure (e.g., a database, flat file, list, etc. . . . ) that holds multiple entries in electronically accessible memory (e.g., RAM, cache, registers, hard disk drives, etc. . . . ). Typically, an order book 114 has two sides, side X and side Y, which can be bid and offer/ask or buy and sell sides for the same resource. The two sides of the order book 114 may be represented as a list pair data structure (one list for the buy side and one list for the sell side). In certain examples, each list of the list pair may be sorted according to one or more attributes of the orders that are part of the respective lists. For example, the orders in the lists may be sorted according to a price value of the order and then according to a timestamp for the order (or sorted by just the timestamp). Thus, if two orders have the same price value, the one with the earlier timestamp will be sorted "higher" into the list. If two orders have the same timestamp, then the logical sequence (e.g., the order in which a sequencer node sequences the originally received data transaction request) in which those orders (or the data transaction requests associated with those orders) were received by the computer system 102 may determine the place of a given order within the sorted list.

In certain example embodiments, order book 114 may include one or more parameters. For example, one parameter may indicate if a first side (e.g., the buy side) of the order book is frozen or locked and another parameter may indicate if the second side (e.g., the sell side) of the order book is frozen or locked.

When a particular side of order book 112 is locked (e.g., by the matching engine 112), then the matching engine 112 may forgo immediately processing an incoming order and instead add newly received data transaction requests to queue 118. In certain example embodiments, different types of data transactions requests (new order requests, order modification requests, order cancelations, etc. . . . ) are all added to the queue when an order book side is frozen. Thus, for example, if a data transaction request for cancelling an order is received for an order that is on a frozen side of the order book, then that data transaction request will be added to the queue and processed with the other data transaction requests that are contained in the queue when that side of the order book is unfrozen.

In certain example embodiments, alterations (e.g., submitted via a data transaction request) on an order in a frozen order book side is placed in the queue and processed when the queue is processed. In certain example embodiments, certain types of data transaction requests may be processed even though their side of the order book is frozen. In certain example embodiments, data transaction request for canceling an order in a frozen order book side are processed immediately (e.g., the order that is stored in the frozen order book is immediately canceled). In other words, cancelations may be processed even if the order is stored in the frozen side of the order book. In certain example embodiments, data transactions requests for cancelation or alteration of orders that are currently stored within the queue 118 may be invalid and/or rejected. In certain example embodiments, data transactions requests for cancelation and/or alteration of orders that are included in queue 118 may be processed once such the orders that are to be canceled or altered are removed from the queue. In certain example embodiments, the data transactions requests for cancelation or alteration of orders may be added to queue for orders that are already in the queue and thus processed in accordance with the processing of the data transaction requests in the queue.

Queue 118 is a data structure that stores data transaction requests that will be processed (e.g., in the order in which they were inserted) when a side of a given order book is unlocked or unfrozen. Accordingly, each side of an order book may have a corresponding queue that is used to hold orders while that side of the order book is frozen. In certain examples, the Queue 118 is provided within (e.g., directly accessible by) the matching engine 112. In other examples, the queue may be provided in a separate process that queues up all orders that may then (upon expiration of the timer discussed herein) pass the queue orders to the matching engine 112 for processing. It will be appreciated that other types of data structures (e.g., other than a queue) may be used to store orders that are pending while a side of an order book 112 is frozen. For example, a stack, a hash table, or other data structure may be used. Additionally, the processing for data transaction requests from the data structure that is used may be other that FIFO. For example, it may be LIFO, random, or based on one or properties of the data transaction requests within the data structure. For example, the data transaction requests may be sorted based on the quantity associated with the respective orders and those with the higher quantity may be processed first.

Subscriber processes 120 include one or more processes that act on data produced or transmitted from other components in computer system 102. For example, one subscriber process may be a process that receives the full details to matched orders (e.g., direct drop). Another may be facilitate the distribution of details of the match to third parties (e.g., subscriber systems 122) via a data stream. Other subscriber processes may include analytic process or regulatory processes. These subscriber processes may receive data that has been transmitted over messaging bus 110.

One or more of the subscriber processes 120 may then communicate with subscriber systems 122. Subscriber systems may include 3$^{rd}$ party computer systems (e.g., those that are receiving a data feed of changes to an order book), regulatory or government systems, and/or systems that handle other parts of an exchange platform (e.g., systems that handle clearing and/or settlement functions).

Freeze process 116 is a process that is configured to receive electronic data messages from the matching engine 112 that contain a signal that a given side of a given order book is to be (or has been) frozen. Upon receipt of such a freeze signal, the freeze process 116 may start a timer for an amount of time (which may be statically set or dynamically determined). For example, the protection timer may be configured to last for 250 micro-seconds. Other example time periods may be 500 or 1000 micro-seconds. In certain examples, other more extended periods of time may be used (e.g., seconds or minutes). In certain examples, the protection timer may be dynamically adjusted such that each time a new order is added to the queue 118, the timer is increased by an additional quantity (e.g., 10 or 50 micro-seconds).

In certain examples, the freeze process 116 maintains a table for all of the timers and which side and order book the given timer is associated with. For example, the freeze process 116 may track active timers using the following example table:

TABLE 1

| Timer  | Side | Order Book |
|--------|------|------------|
| 150 μs | Buy  | AXDR       |
| 100 μs | Buy  | DRT        |
| 50 μs  | Sell | DRT        |

Accordingly, the freeze process 116 may track multiple different timers that are used for different order books and the associated matching engines. In certain examples, the timers (and the freeze processing associated therewith) may be configured (or enabled) on a per instrument and/or per side basis (e.g., side X and side Y of the same instrument have different length timers that are used). In certain examples, the timers have a precision down to the micro-second. In certain example embodiments, timers and the freeze processing associated therewith may be configured or enabled on a class or series basis. In certain example embodiments, timers and the freeze processing associated therewith may be enabled or configured for combination orders. For example, a first setting may configure or enable timers across a class of instruments or class of combination orders. A second setting may then enable or configure timers on a per instrument (e.g., series) or combination order (e.g., series) basis. If the second setting is used it may then override the first setting. Both enabling/disabling the freeze functionality and the length of the timers may be set in this manner.

It will be appreciated that the exact time for individual timers may vary slightly (e.g., based on the type of computer and/or operating system being used). It will also be appreciated that the amount of time that a side of an order book may be frozen may be additionally based on the time it takes to process an order and communicate instructions regarding the same. For example, it may be take the matching engine 20 micro-seconds to determine if an order is executable, 20 micro-seconds to store the order to queue 118, 200 nano-seconds to communicate a message to the freeze process (e.g., if the process is being executed on the same computing device as the matching engine), 5 micro-seconds for the freeze process to receive and process the freeze message, 5 micro-seconds to process the expiration the protection timer (which may be configurable itself), another 200 non-seconds for the unfreeze message to reach the matching engine, and 5 micro-seconds for the matching engine to receive and process the unfreeze message. Notably, the above times are examples and other time periods are also possible depending on the nature and speed of the processing and whether the matching engine and freeze process are be handled by the same underlying computing device. Accordingly, for example, if a configurable protection timer is for 250 micro-seconds, then the actual time that a given side of an order may be frozen may be about 300 micro-seconds (e.g., taking into account about 50 micro-seconds of processing and communication).

Returning to the above example table, there are three protection timers that are active and counting down. Two are for a resource that is identified as DRT (e.g., a resource that has a ticker symbol of DRT) and another is for a resource identified as AXDR. Accordingly, a single freeze process may handle protection timers for multiple different matching engines and corresponding order books. In certain examples, each matching engine and order book (e.g., each resource) may have its own dedicated freeze process that maintains a timer for the respective sides of its order book.

In certain examples, freeze processes may be spun up and down on demand. For example, for each new freeze message sent over the communication bus a new freeze process may be started to track the corresponding timer. In certain examples, an individual freeze process may be configured to handle a set number of timers (e.g., 10 or 100). In certain examples, a freeze process on a given computing node may handle timers for all matching engines that are being executed on the same computing node (or a given cluster of nodes). Such an implementation may operate to address network communication latencies between the matching engine and the freeze process. Accordingly, the freeze process and the matching engine may operate on the same computing hardware machine. Such an implementation may function to advantageously decrease, reduce, or minimize network communication between the processes according to certain example embodiments.

While the protection timer is active (or while a given side of an order book is in a locked or frozen state), data transaction requests may be queued within a corresponding queue 118. In certain examples, the matching engine 112 writes directly to the queue 118. In certain examples, the freeze process 116 may instead write to the queue 118 and the matching engine 112 reads from the queue (e.g., upon expiration of the timer). In any event, upon expiration of the freeze timer, an unfreeze signal may be sent back to the matching engine 112, which may then process the data transaction requests that are contained in the queue 118.

When the matching engine 112 resumes processing after an unfreeze signal, it may hold reception of new data transaction requests while the data transaction request(s) that are in the queue 118 are processed in the order in which they were inserted.

In certain examples, each of the components of computer system 102 (e.g., gateway 108, matching engine 112, freeze process 116, subscriber processes 120, queue 118, order book 114, sequencer, etc.) may have a backup or failover process (e.g., in the case of software or hardware failure). For example, in the case of a failure of the primary freeze process 116, the computer system 102 may include failover processing such that a backup or secondary freeze process takes over the execution of the timer from the primary failed process. This may occur by having the secondary freeze process act on freeze messages that are disseminated over the messaging bus 110. In other words, the secondary freeze process may have a timer running just like the primary freeze process (e.g., in the event of failover).

Each instance of matching engine 112 and freeze process 116 that is operating in computer system 102 may be a separate computer process (or a separate thread or a process that includes multiple threads). Computer processes are instances of a computer program that are being executed by the underlying processing resources. Thus, for example, a matching engine program may be stored in memory of computer system 102 and each instance of matching engine 112 may be an executing instance of that program. Similarly, a freeze process program may be stored in memory of the computer system 102 and each instance that is being executed may be freeze process 116.

While the freeze process 116 is provided as a separate process in certain example embodiments, in certain alternative embodiments the functionality of the freeze process may be provided in the matching engine 112. In other words, the timers that are maintained by the freeze process may instead be directly maintained by the matching engine. Thus, the functionality discussed herein in connection with the "freeze process" may be provided in a separate process (e.g., a separate computer process) or may be incorporated into an existing process (e.g., the matching engine 112) that is executed on computer system 102. In certain example embodiments, due to the time-critical nature of the freeze processing, such freeze processing functionality may be exercised in the PRV market before opening.

Figure 2A:
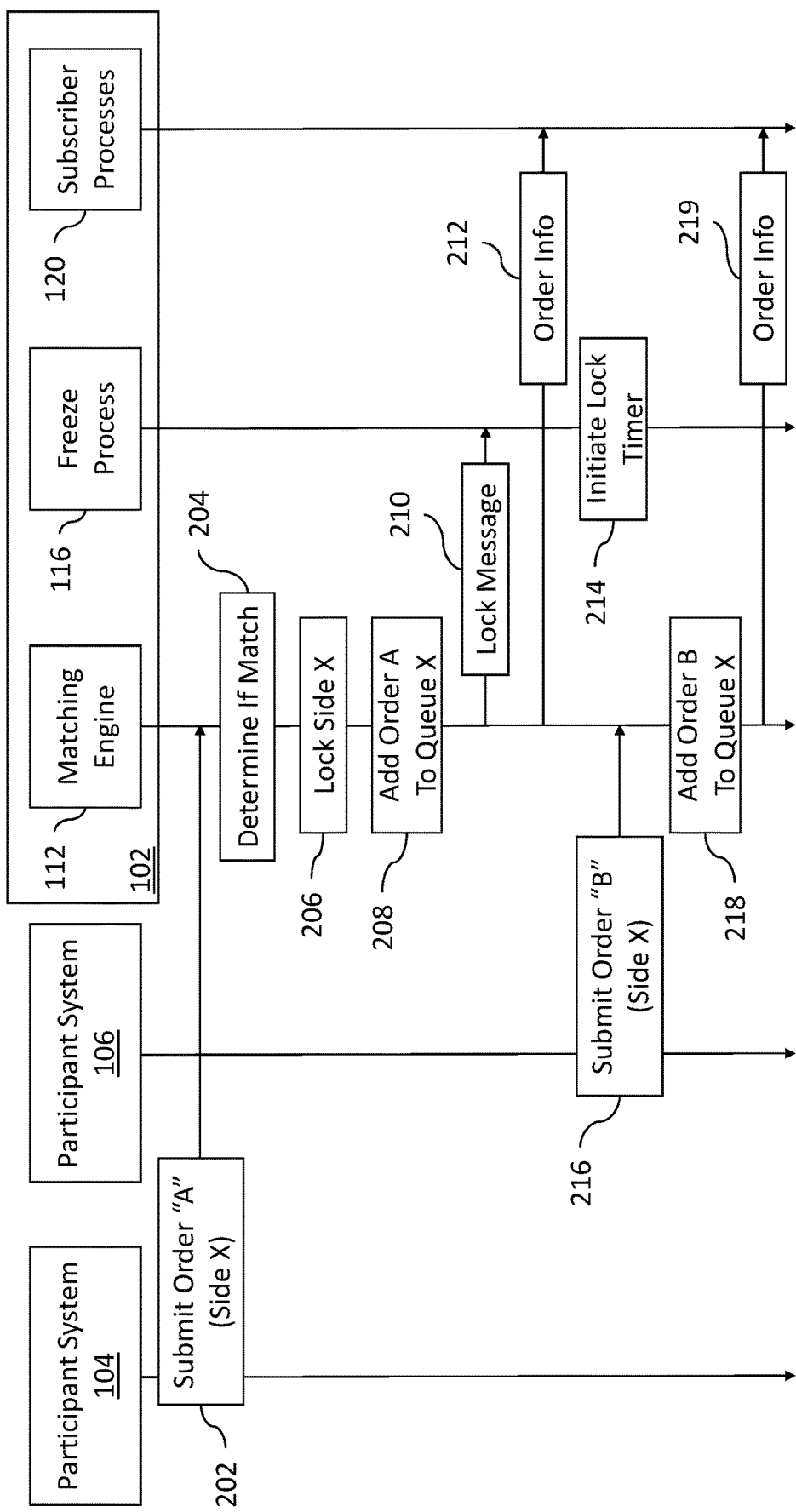
FIGS. 2A-2B are signal diagrams that illustrate communications between the components shown in FIG. 1 according to certain example embodiments.
Figure 2B:
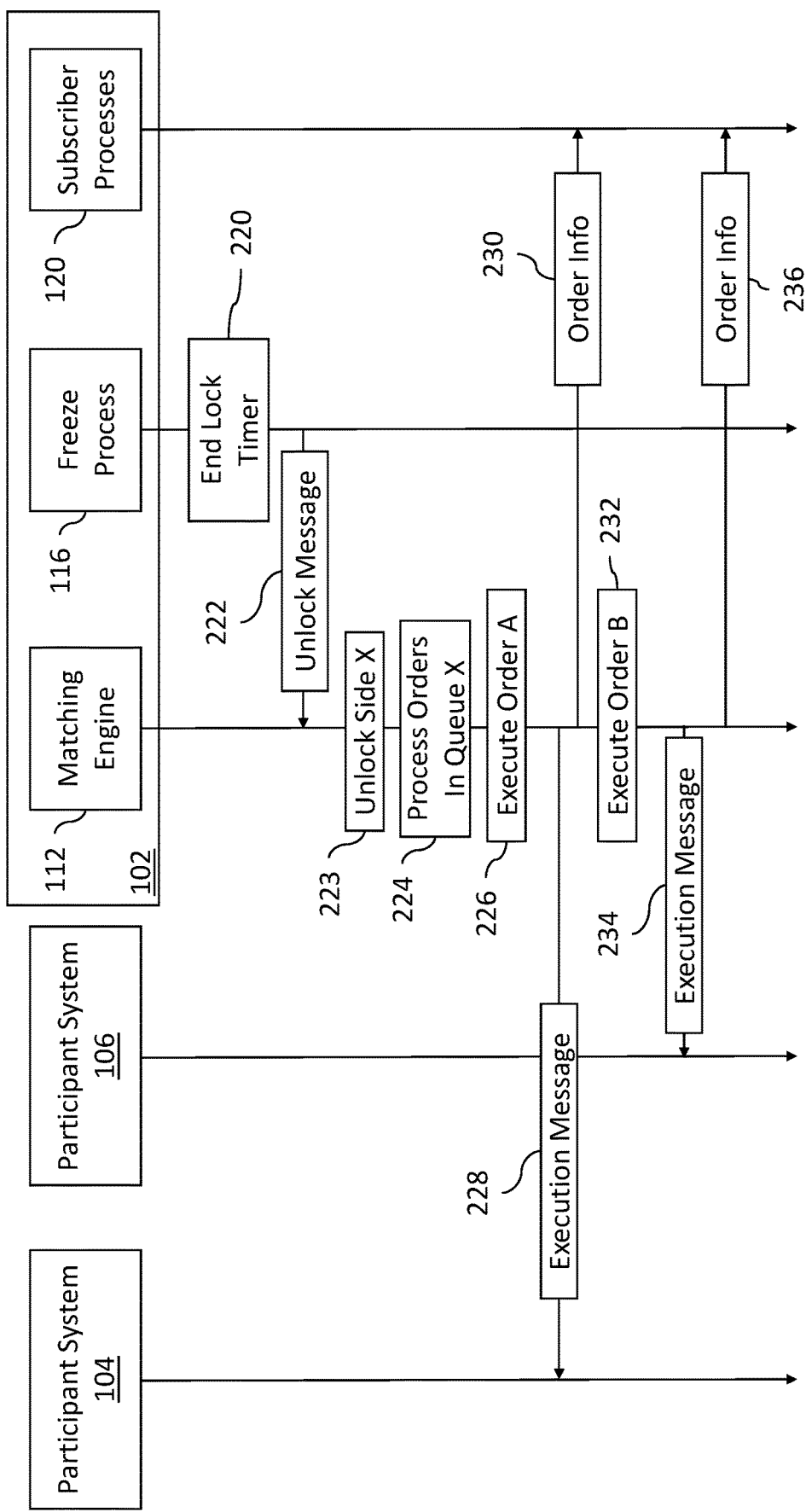

Description of FIGS. 2A-2B

FIGS. 2A-2B are signal diagrams that illustrate communications between the components shown in FIG. 1 according to certain example embodiments.

At 202, participant system 104 submits Order "A" to computer system 102. The order A is received by gateway 108 that may perform the processing on the received order (e.g., validation, etc. . . . ). Gateway 108 then passes the order to the matching engine 112 via the messaging bus 110. In certain examples, the message that contains order is first sequenced by a sequencer process before being communicated to matching engine 112. In certain examples, the sequencer and the matching engine 112 are the same computer process. Accordingly, the matching engine 112/sequencer may assign each data transaction request a sequence number when the matching engine 112 first receives the corresponding data transaction request.

At 204, the matching engine receives order A for side X. Upon reception of order A (and assuming side X of order book 114 is not already locked), the matching engine 112 determines if Order A can immediately match with an order on the contra-side (side Y) of order book 114.

If Order A cannot match (not shown in FIG. 2A), then it processed normally by the matching engine 112. For example, if Order A was an immediate or cancel order, then it is canceled (e.g., because it could not immediately match) or if it was a limit order it is added to the order book 114.

Determination of a match may include determining if the order can fully match or partially match against a contra sided order. For example, if Order A is for 1000 shares and only 500 shares can match, then that would be a positive determination of a match possibility at step 204.

In certain examples, only matches above a certain size are considered "matches" for purposes of step 204. For example, if order A is for 50 shares and a match is determined, then the match may be processed normally without freezing an order book side. However, if Order A is for 1000 shares, then the freeze processing may be triggered (e.g. if a 1000 shares is a threshold amount). Accordingly, in certain examples, determination of a match may include conditional parameters for purposes of determining a match according to step 204.

In certain examples, determination of match at 204 may include modifying an existing order already present in the order book 114. For example, if Order D is in the order book and a data transaction request is received to modify order D (e.g., to a new price) and the result of that modification is that order D is determined to be matchable, then the 206 and subsequent steps may be triggered. In other words, modification of an existing order may be treated as if the modified order is a newly received order. In such instances, the data transaction request to modify an existing order is added to the queue and processed as described herein.

In certain examples, if a triggered order (e.g., a stop order) is activated and becomes an aggressive order (e.g., it can match with a resting order), then this may also cause a freeze of the order book. For example, if a triggered order is awakened (e.g., because of some event, such as hitting a given price) and can match once awakened, then it will also become an aggressive order and subject to the freeze processing discussed herein. However, if the triggered order cannot match, then it will be treated as a passive order and placed into the order book (e.g., assuming that side of the order book is not already frozen). In certain examples, a trigger order's order id will remain unchanged even if it triggers the order book freeze.

At 206, if order A can immediately match, then the matching engine 112 locks the X side of the order book 114 (the same side as the side of order A). As noted above, then may involve changing a parameter (e.g., SideXisLocked) of the order book 114 to a value (e.g., TRUE) that indicates that a specific side of the order book (or just the order book) is locked. Once a side of the order book 114 is locked, the matching engine 112 may be configured to only unlock that side of the order book 114 when the matching engine 112 receives an unlock message from another component (e.g., freeze process 116) via the messaging bus.

Once a side of the order book is locked, then all orders (e.g., newly received orders) may be subject to the initiated lock. This may apply to orders regardless of time-in-force or order type conditions. Thus, for example, IOC orders may be queued instead of being immediately processed. Rather, the order will be "immediately" processed upon unlocking of the locked order book side.

Along with locking side X of the order boo, at 208, order A is added to queue 118. In certain examples, the in-memory location (e.g., with memory device 404) of queue 118 may be directly accessible from the process space of the matching engine.

At 210, a message is generated by the matching engine 112 and sent over the messaging bus that side X of order book 118 has been locked. Similarly, a message is set at 212 that contains the order information of the order that was added to the queue (thus effectively delaying the processing of order A). One or more subscriber processes 120 may then store this information for later analysis or processing. In certain examples, the message sent at 212 is a part of the Direct Drop protocol and contains information on the order that has been added to the queue. In certain examples, the subscriber processes that act on the order info 212 message may only be those processes that process such information internally to computer system 102. In other words, data on the freeze or lock of the order book (or that order A was added to the queue) may not be disseminated to third party subscriber systems 122 (or participant computer systems). In certain examples, the lock message and the order information message may be the same message that is communicated over the messaging bus 110—with the different processes (the freeze process 116 and subscriber process 120) acting on that message differently according the processing of the respective process.

In certain examples, even though an order has been processed by the matching engine 112 and placed into queue 118, no acknowledgement is sent back to the participating computer system as to how the order has been processed. Rather, an acknowledgement message may be sent after the order is processed by the matching engine 112 after coming out of the queue 118 (e.g., at 228 and 234 in FIG. 2B). In certain example embodiments, gateway 108 (e.g., a FIX gateway) that received the original order (e.g., at 202) may receive an output message (e.g., 210 or 212). When this occurs, the gateway 108 may read and process the next message in its buffer (e.g., send the next received message to the matching engine) without sending an acknowledgement.

At 214, the freeze process 116 receives the lock message 210 and in response to reception of that message initiates a lock timer (also called a freeze or protection timer herein). It will be appreciated that the timer is maintained in a process that is separate from the matching engine 112 (and potentially on a separate computing node from matching engine). Separating the timer from the matching engine may assist in providing reliability to the matching engine 112.

Separating the timer (e.g., the freeze process) from the matching engine 112 may have one or more of the following advantages. If the matching engine 112 fails (e.g., a software failure, a hardware failure, etc. . . . ), then the timer in the freeze process will still be able to operate because it may be executing separately or independently from the matching engine 112. For example, the freeze process may be executing in a separate computer process that may be operating on separate computing hardware, in a separate virtual machine, or in a separate virtual container (e.g., a docker container). Thus, if a primary matching engine 112 fails, and a backup matching engine takes over, then the timer processing in the freeze process will still be active and executing.

In certain instances, adding a timer to a matching engine may be unreliable due to a potential need to synchronize the timers between primary and backup matching engines. In other words, activating a timer in a primary matching engine could be tricky because then the primary matching engine would have to tell the backup to activate a timer. The latency of this operation may also slow down the processing in the primary matching engine due to potentially needing to wait for confirmation that the timer in the backup has been activated.

It will be appreciated however, that in certain example embodiments that the timer functionality provided by the freeze process may be included in the matching engine.

At 216, participant system 106 submits order B (also for side X). As with order A, computer system 102 receives order B at gateway 108, which may validate or otherwise process the incoming order B. The gateway 108 then communicates order B over messaging bus to the matching engine 112.

At 218, the order book 114 for side X is still locked and accordingly order B is immediately added to the queue 118 (e.g., behind order A). Accordingly, the queue that is being maintained by the matching engine 112 includes, in order, Order A followed by Order B.

Note that even if order B is potentially matchable that it will not initiate a new timer, but will rather be queued with order A and subject the already started timer.

Turning to FIG. 2B, the lock timer that is being maintained by the freeze process 116 ends at 220. In response to the expiration of the timer, the freeze process 116 generates and sends an unfreeze message over the messaging bus at 222.

The unfreeze message is received by the matching engine 112 at 223. In certain examples, the unfreeze message is added to the end of the queue of messages that the matching engine 112 is processing (e.g., processing new messages that are received from the gateway 108, etc. . . . ). Once the unfreeze message is processed by the matching engine 112, then side X of the order book 114 is unlocked. Even though the order book is unlocked, new orders (e.g. those not already in the queue) are not processed by the matching engine 112 until the queue 118 is emptied.

At 224, the matching engine 112 begins processing the orders that are included the queue 118. In certain example embodiments, orders that are processed coming out of the queue 118 are given new timestamps that correspond to when the order becomes unfrozen. Note that this timestamp may be different from a timestamp that is assigned when the order is first received by the matching engine (e.g., at 204). Accordingly, the new timestamp may overwrite an existing timestamp (e.g., that was provided when the matching engine first received the order). In certain examples, the new timestamp may be used in ranking or sorting the order within the order book 114. For example, if the order book is sorted based on time (e.g., price/time). In certain examples, if more than one order is included in the queue 118 at the time a given side is unfrozen, then all orders in the queue may receive the same timestamp. However, the orders will still have different sequence numbers that indicate the logical order in which they were processed the computer system 102 (e.g., the matching engine 112). Accordingly, sorting by price/time may also sort based on a sequence number.

At 226, order A is executed and an execution message at 228 is returned to participant system 104. The message at 228 may be routed through the gateway 108. Note that message 228 may be the first message received by participant system 104 from the computer system 102 that order A has been processed. Similarly, subscriber processes 120 may be notified of the execution order A via the order information message 230. Subscriber processes may then disseminate information regarding execution of order A to subscriber systems 122.

After processing order A, then matching engine 112 takes the next order out of the queue 118, order B, and executes that order at 232. An execution message is transmitted back to participant system 106 at 234 and information regarding execution of order B is disseminated to subscriber processes 120 at 236.

In certain example embodiments, orders that are in combination series that match against outrights may be unaffected by an active protection time (or the locking of a particular side of an order book). In certain examples, an incoming aggressive combination order can execute against a leg—even if that leg is on a side of an order book that is frozen.

In certain example embodiments, quotes (e.g., both single quotes and mass quotes) may be unaffected by active protection timers and associated locked sides of an order book.

In certain examples, an entire order book may be frozen (e.g., both sides) in response to determination that an order is eligible to immediately match. In such an implementation, two different queues may be used to store orders for each side of the order book while the entire order book is frozen.

In certain example, a combination order that can match combination-vs-outrights is allowed to match a frozen side of an order book. In certain examples, this may apply to both incoming aggressive combination orders and to modified combination orders that are modified to become matchable.

In certain examples, the freeze processing described herein may be suspended or not active in uncrossing situations (e.g., auctions). For example, during opening auctions, closing auctions, or uncrossing auctions when a circuit breaker ends.

In certain example embodiments, the functionality described herein (e.g., in connection with the freeze timer, freeze process, and items affected by such components) may be written to a log that is stored to memory (e.g., memory device 4040). This may allow for analysis and/or review of how the processing of orders in connection with the functionality described herein occurs.

FIG. 3

Figure 3:
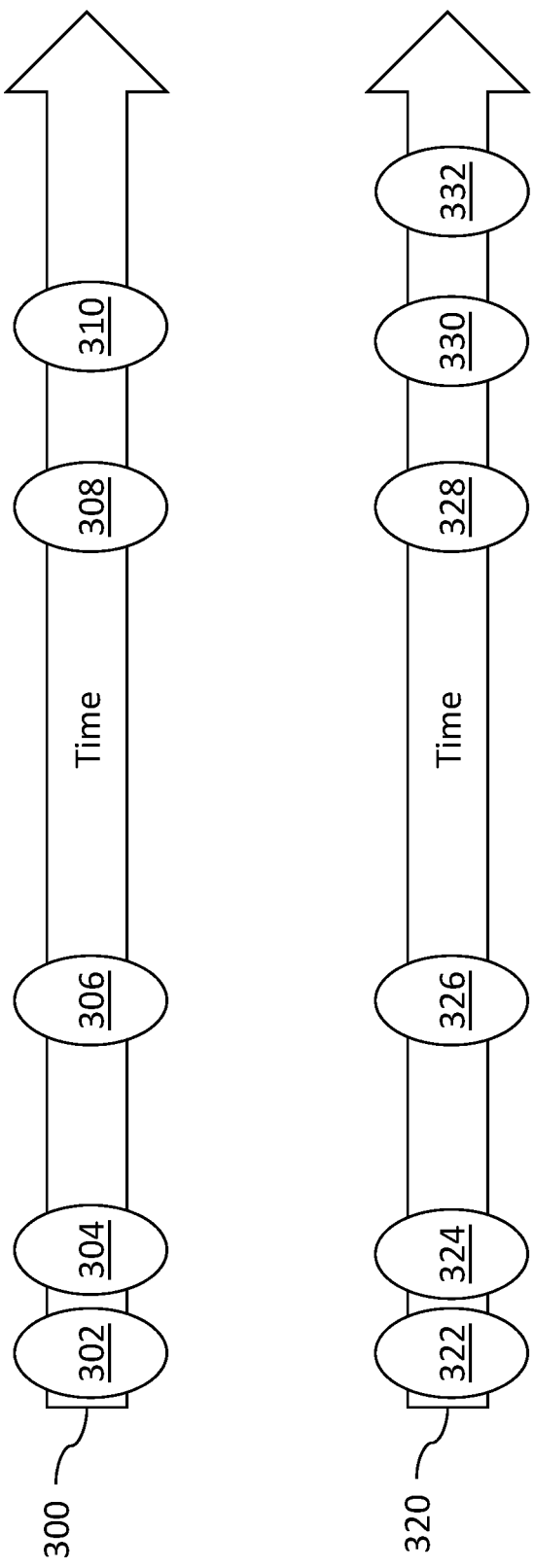
FIG. 3 shows two illustrative timeline examples according to certain example embodiments.

FIG. 3 shows two illustrative timeline examples according to certain example embodiments.

For timeline 300 an order book includes a resting order (order A) for buy 10@100.

At 302 (at time 0 microseconds), an incoming order (order B—sell 20@99) is received by the matching engine 112. The matching engine 112 determines that order B can match against order A that is resting in the order book 114. This determination triggers the freezing of the sell side of the order book 114. The matching engine also stores order B in queue 118 and sends a freeze signal over the messaging bus 110.

At 304 (at time 15 microseconds after 302), the freeze process receives and processes the freeze message and starts a protection timer for 250 micro-seconds.

At 306 (at time 183 micro-seconds after 302), the matching engine 112 receives order C (buy 10@100). Since order C cannot match against any orders in the order book, and the buy side of the order book is not frozen, order C is immediately inserted in the order book at order book position #2 (e.g., behind order A).

At 308 (at time 265 micro-seconds after 302), the protection timer being maintained by the freeze process 116 expires and an unfreeze message is transmitted from the freeze process.

At 310, (at time 280 micro-seconds after 302), the matching engine 112 receives the unfreeze message and unfreezes (unlocks) the buy side of the order book. Order B is now processed by the matching engine 112. Order B is subsequently matched against both orders A and C at a price of 100.

Thus, both orders A and C are executed against order B at price 100. Note that if the freeze had not occurred, then order A would execute against order B at price 100, but order C would execute against order B at price 99 (e.g., because the remaining quantity of order B @ 99 would then be added to the order book to subsequently match against order C when it is received).

For example timeline 320, order book includes a resting buy order (Order A) for 10@100.

At 322 (at time 0 microseconds), an incoming sell order B (10@100) is received by the matching engine 112. The matching engine 112 determines that order B can match against order A that is currently resting in order book 114. This determination triggers the freezing of the sell side of the order book 114. The matching engine also stores order B in a queue 118 that is associated with the sell side of the order book and sends a freeze signal over the messaging bus.

At 324 (at time 15 microseconds), the freeze process receives and processes the freeze message and starts a protection timer for 250 micro-seconds.

At 326 (at time 180 microseconds), a data transaction request is received by the matching engine 112 to modify resting order A to 10@99. This does not trigger a match as order B has not been placed into the order book yet (because the buy side of the order book is still frozen).

At 328 (at time 220 microseconds), an incoming sell order C (10@100) is received by the matching engine 112. Since the sell-side of the order book is currently frozen, order C is added to the queue 118, after order B.

At 330 (at time 265 microseconds), the protection timer being maintained by the freeze process 116 expires and an unfreeze message is transmitted from the freeze process over the messaging bus 110.

At 332 (at time 280 microseconds), the matching engine 112 receives the unfreeze message and unfreezes the sell side of the order book. The matching engine then begins to process the orders contained in queue 118. Order B is processed first (it was inserted first and is at the front of the queue). The matching engine 112 determines that order B cannot match and is added to the order book. Order B is given a new timestamp that corresponds to the time the order book was unfrozen and is placed at the first position in the order book (there are no other orders in the order book). Notably, the prior determination by the matching engine (at 322) that order B could match is not used to determine if order B can now match. This is because order A was modified while Order B was in the queue.

After processing order B, the matching engine 112 also processes order C. Order C also cannot match and is likewise added to the order book. Order C is also given a new timestamp that is the same as order B (e.g., the time that the order book was unlocked). Order C is thus at position 2 within order book.

In certain example embodiments, if an incoming aggressive order can match immediately against an already frozen order book side, the frozen order book side is immediately un-frozen. The orders within the queue on the now unfrozen side may be processed. This processing may occur before the opposite side is frozen (e.g., due to being frozen from the above mentioned incoming aggressive order that will be stored in the queue. In other words, the sides of the order book that are frozen may shift from one to the other and between that shift the orders in the previously frozen side may be processed. In certain example embodiments, the side that is froze will be unfrozen by the matching engine without first waiting for the signal from the freeze process. When the un-freeze signal is received from the freeze process, it may then be ignored by the matching engine.

The following is an example that illustrates shifting the frozen side of an order book.

TABLE 2

| Order # | Qty | Bid | Offer | Qty | Order # |
|---|---|---|---|---|---|
| 1 | 10 | 110 | 111 | 10 | 2 |

With this state, the following events may occur.

First, Buy 10@111 (order #3) is received. This order can match and thus the bid side is frozen and order #3 is added to the queue. The timer then starts in response for this freezing.

Second, Buy 10@110 (order #4) is received. Order #4 is queued after order #3, since the buy side is frozen.

Third, Sell 10@111 (order #5) is received. This is added to the order book since the offer side isn't frozen.

Fourth, Sell 10@110 (order #6) is received. This order can match against the buy side—but it is currently frozen. This triggers a shift in the frozen side and the following processing occurs: A) The bid-side of the order book is un-frozen (e.g., by the matching engine), B) Order #3 from the queue is processed. This order matches against order #2 in the order book, C) Order #4 from the queue is then processed. This order is inserted in the order book on the buy side, after order #1, D) The offer-side is then frozen (e.g., in a manner similar to discussed in connection with FIGS. 2A and 2B), and E) The new incoming aggressive order (order #6) is added to the queue for the new frozen offer side of the order book.

Figure 5:
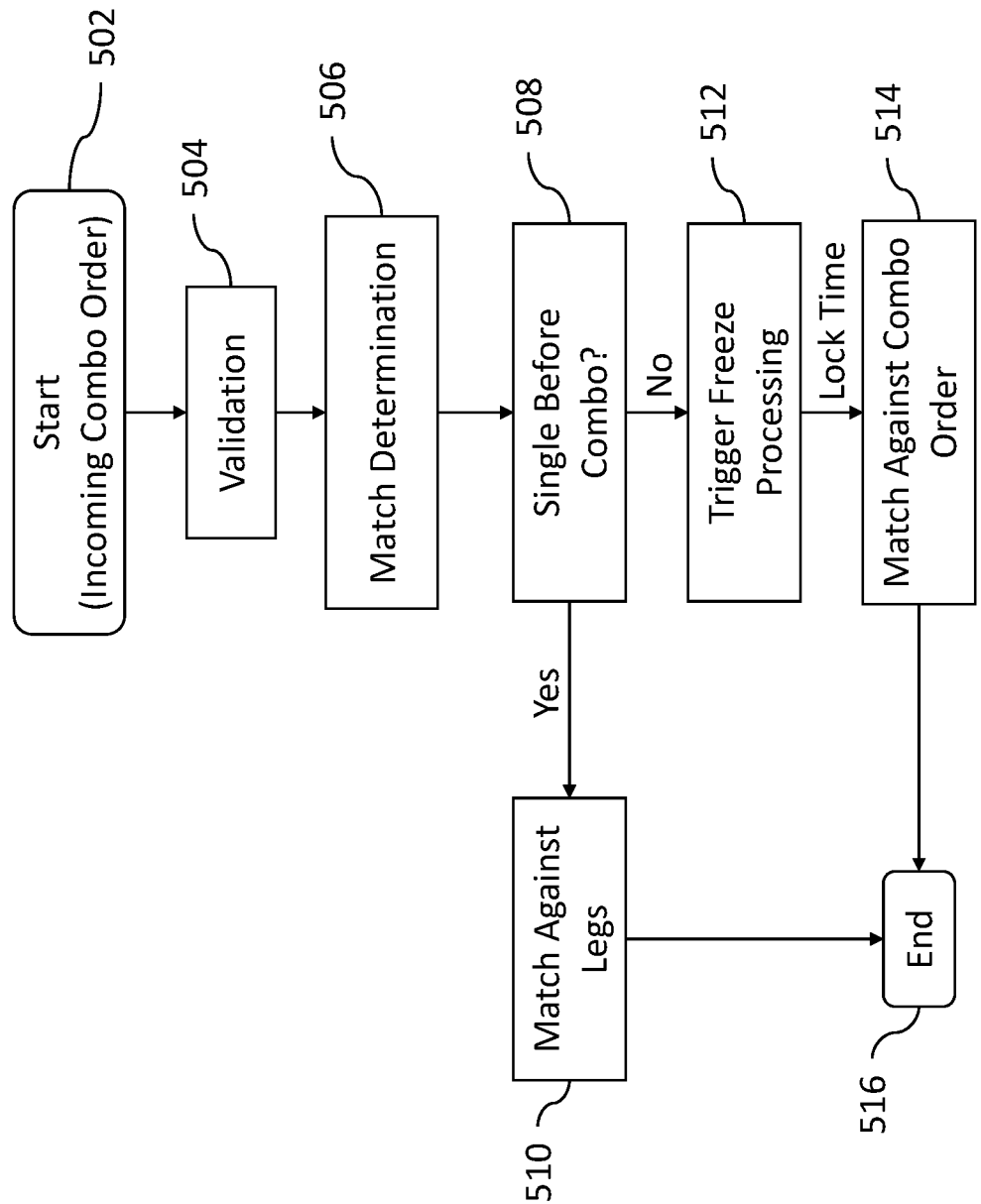
FIG. 5 shows a flowchart of an example process for processing data transaction requests that include combo orders according to certain example embodiments.

Description of FIG. 5

FIG. 5 shows a flowchart of an example process for processing data transaction requests that include combo orders according to certain example embodiments.

In certain example embodiments, the computer system 102 may be configured to perform the example process shown in FIG. 5. Specifically, the computer 102 may be configured to handle processing for combination orders and using the freeze process 116 for such orders according to the processing shown in FIG. 5. In certain example embodiments, the timer used by the freeze process may be triggered by a combination series order. In certain example embodiments, such functionality may be configured on a per combination series or class basis.

Combination orders can be configured to match against other orders in different ways. One option may be only allow combination orders to match against other combination orders. Another option may be to only allow combination orders to match against single orders. A third option may be "single always before combo." In this case, the incoming combination order is matched against single orders, at the same price, if possible, before the combination order is matched against other combination orders. A fourth option may be "combo always before single" where the newly received combination order is matched against other combination orders, if possible, before it is matched against single orders. In certain example embodiments, this functionality may be configured on a per combination series or combination class basis.

Turning now to FIG. 5, an example process is shown where a combination order is processed using the above mentioned single before combo option. At 502, a participant system submits a data transaction request that includes a combination order. At 504, the data transaction request and the details of the combination order contained therein are validated.

At 506, computer system 102 (e.g., matching engine 112) determines that the combination order is matchable. In certain example embodiments, this may include determination that the incoming combination order can match against a resting combination order and/or against for the legs at the same price. The result of this match determination may include multiple different possible results.

A first results may be that the incoming combination order can only match an opposing combination order (e.g., and not the single legs), then the freeze process 116 will be used on the combination order book. When the initiated timer associated with the freeze process expires, the incoming (e.g., aggressive) combination order will then match against the resting combination order.

A second result may be a determination that the incoming combination order can only match against the legs, but not any other combination order. In this case, the freeze process will not be triggered and the incoming combination order is matched against the legs as would normally occur.

A third result may be a determination that the incoming order is not matchable. In this case, then (as with the description from FIG. 2A), it is processed normally by the matching engine 112. For example, if it was an immediate or cancel order, then it is canceled (e.g., because it could not immediately match) or if it was a limit order it is added to an appropriate order book (e.g., one for combination orders).

A fourth result may be that the incoming combination order can match both an opposing combination order and the legs at the same price. In this case, the processing may proceed as discussed in connection with FIG. 5 (e.g., 508) and determining whether the order will be processed using a single always before combo rule or a combo always before single rule.

A fifth result may be a determination that an incoming combination order is large enough to match both an opposing combination order and the legs. In such an instance (not shown in FIG. 5), then the entire aggressive combination order may be processed using the freeze process (e.g., without first matching against the legs even if the single before combo option is set). In such a situation, matching is delayed for both the legs and the opposing combination order according to the freeze process.

Returning to FIG. 5, if a match is identified and the incoming combination order can match both an opposing combination order and the legs at the same price, then, at 508, the system determines if the "single always before combo" is set for the combination order that is being processed. If it is set to yes or true, then the process proceeds to 510 and the combination order is matched against the legs (e.g., as it would normally) and the process ends at 516. In other words, if the incoming combination order is to match against the legs, the functionality associated with the freeze process is not used and no lock timer is triggered.

If, however, the incoming combination order is not to be processed according to the single before combo setting, then the combination order is treated in a manner similar to that discussed in connection with FIGS. 2A and 2B where the freeze processing (e.g., by the freeze process 116 that uses a lock timer) is triggered at 512. Upon expiration of the lock time in the freeze process, the incoming combination order is then matched at 514 to the opposing combination order.

Description of FIG. 4

FIG. 4 is a block diagram of an example computing device 400 (which may also be referred to, for example, as a "computing device," "computer system," or "computing system") according to some embodiments. In some embodiments, the computing device 400 includes one or more of the following: one or more processors 402; one or more memory devices 404; one or more network interface devices 406; one or more display interfaces 408; and one or more user input adapters 410. Additionally, in some embodiments, the computing device 400 is connected to or includes a display device 412. As will explained below, these elements (e.g., the processors 402, memory devices 404, network interface devices 406, display interfaces 408, user input adapters 410, display device 412) are hardware devices (for example, electronic circuits or combinations of circuits) that are configured to perform various different functions for the computing device 400.

In some embodiments, each or any of the processors 402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 402 uses an instruction set architecture such as x86 or Advanced RISC Machine (ARM).

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 402). Memory devices 404 are examples of non-volatile computer-readable storage media.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 408 is or includes one or more circuits that receive data from the processors 402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 412, which displays the image data. Alternatively or additionally, in some embodiments, each or any of the display interfaces 408 is or includes, for example, a video card, video adapter, or graphics processing unit (GPU).

In some embodiments, each or any of the user input adapters 410 is or includes one or more circuits that receive and process user input data from one or more user input devices (not shown in FIG. 4) that are included in, attached to, or otherwise in communication with the computing device 400, and that output data based on the received input data to the processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices (not shown in FIG. 4) such as, for example, a keyboard, mouse, trackpad, touchscreen, etc. . . .

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 412 is connected to the computing device 400 (e.g., is external to the computing device 400 and communicates with the computing device 400 via a wire and/or via wireless communication technology), the display device 412 is, for example, an external monitor, projector, television, display screen, etc. . . .

In various embodiments, the computing device 400 includes one, or two, or three, four, or more of each or any of the above-mentioned elements (e.g., the processors 402, memory devices 404, network interface devices 406, display interfaces 408, and user input adapters 410). Alternatively or additionally, in some embodiments, the computing device 400 includes one or more of: a processing system that includes the processors 402; a memory or storage system that includes the memory devices 404; and a network interface system that includes the network interface devices 406.

The computing device 400 may be arranged, in various embodiments, in many different ways. As just one example, the computing device 400 may be arranged such that the processors 402 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 400 may be arranged such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of computer system 102, the participant systems 104 and 106, gateway 108, matching engine 112, freeze process 116, subscriber processes 120, and subscriber systems 122, each of which will be referred to individually for clarity as a "component" for the remainder of this paragraph, are implemented using an example of the computing device 400 of FIG. 5. In such embodiments, the following applies for each component: (a) the elements of the 400 computing device 400 shown in FIG. 4 (i.e., the one or more processors 402, one or more memory devices 404, one or more network interface devices 406, one or more display interfaces 408, and one or more user input adapters 410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 404 (e.g., in various embodiments, in a volatile memory device such as a RAM or an instruction register and/or in a non-volatile memory device such as a flash memory or hard disk) and all actions described herein as performed by the software modules are performed by the processors 402 in conjunction with, as appropriate, the other elements in and/or connected to the computing device 400 (i.e., the network interface devices 406, display interfaces 408, user input adapters 410, and/or display device 412); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (i.e., the network interface devices 406, display interfaces 408, user input adapters 410, and/or display device 512); (d) alternatively or additionally, in some embodiments, the memory devices 402 store instructions that, when executed by the processors 402, cause the processors 402 to perform, in conjunction with, as appropriate, the other elements in and/or connected to the computing device 400 (i.e., the memory devices 404, network interface devices 406, display interfaces 408, user input adapters 410, and/or display device 512), each or any combination of actions described herein as performed by the component and/or by any software modules described herein as included within the component.

Consistent with the description herein, as one example, in an embodiment where an instance of the computing device 400 is used to implement matching engine 112, the memory devices 404 could store order book 114 and queues 118 (e.g., for each side of the order book), and/or store the data described herein as processed and/or otherwise handled by the matching engine 112. Processors 402 may be used to operate the matching engine 112 and freeze process 116. The real-time-clock of processors 402 may be used to keep track of timers that are used by freeze process 116.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

Technical Advantages of Described Subject Matter

In certain example embodiments, a freeze for a first side of a data structure used for storing data transaction requests is used to allow for processing data transaction requests on the second side that are received after the opposing side. This type of implementation may assist in mitigating latency differences between different participant systems in how they interact with the computer system and/or the matching engine thereof.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could"

is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 2A-2B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system comprising:
   electronic memory configured to store a data structure that includes at least two different types of data transaction requests, wherein a first type of data transaction requests is contra-sided to a second type of data transaction requests;
   a transceiver configured to receive data transaction requests for processing by the distributed computer system;
   a processing system that includes at least one hardware processor, the processing system configured to:
   receive, via the transceiver, a first data transaction request that is of the first type of data transaction requests;
   determine whether the first data transaction request is matchable against any other data transaction requests that are pending within the data structure and contra-sided to the first data transaction request;
   based on determination that the first data transaction request is matchable:
   initiate a timer for a time period,
   lock the first type of transaction requests from processing against the data structure while the timer is active, and
   store the first data transaction request to a queue,
   while the timer is active and has yet to expire, process subsequently received data transaction requests that are of the first type and add those subsequently received data transaction requests to the queue; and
   as a result of expiration of the timer for the time period, unlock the first type of transaction requests to process against the data structure and process data transaction requests that are included in the queue against a current state of the data structure.

2. The distributed computer system of claim 1, wherein the processing system is further configured to:
   execute a matching engine computer process and a locking computer process, wherein the matching engine computer process handles determination of whether the first data transaction request is matchable against any other data transaction requests that are pending within the data structure and contra-sided to the first data transaction request, wherein the locking computer process handles initiation of the timer for the time period.

3. The distributed computer system of claim 2, wherein the matching engine computer process and the locking computer process are separate computer processes.

4. The distributed computer system of claim 3, wherein the matching engine computer process and the locking computer process are executed by the same computing device.

5. The distributed computer system of claim 1, wherein the processing system is further configured to:
   receive, via the transceiver, a second data transaction request that is of the first type of data transaction requests; and
   based on the first type of transaction requests being locked from processing against the data structure, add the second data transaction request to the queue.

6. The distributed computer system of claim 5, wherein the second data transaction request is not matchable when added to the queue.

7. The distributed computer system of claim 5, wherein the second data transaction request is a request to modify an existing data transaction request that is already stored in the data structure.

8. The distributed computer system of claim 5, wherein the processing system is further configured to:

receive, via the transceiver, a third data transaction request that is of the first type of data transaction requests; and while, the first type of transaction requests are locked from processing against the data structure and determination that the third data transaction request is a request to cancel an existing data transaction request that is already stored in the data structure, cancel the existing data transaction request prior to unlocking of the type of transaction requests from processing.

9. The distributed computer system of claim 1, wherein the processing system is further configured to:

receive, after the first data transaction request is received and while the first type of transaction requests is locked from processing against the data structure, a second data transaction request that is of the second type of data transaction requests, wherein the second data transaction request is a request to modify an existing data transaction request that is stored in the data structure; and prior to processing the first data transaction request upon unlocking, modify at least one value of the existing data transaction request by processing the second data transaction request.

10. The distributed computer system of claim 9, wherein, upon unlocking the first type of transaction requests to process against the data structure, the first data transaction request is determined to be matchable against the existing data transaction request for which the at least one value was modified based on the processing of the second data transaction request.

11. The distributed computer system of claim 1, wherein all of the data transaction requests that are included in the queue when the type of transaction requests are unlocked for processing are given the same timestamp.

12. A method implemented on a computer system, the method comprising:

storing, to non-transitory computer memory of a computer system, a data structure that includes at least two different types of data transaction requests, wherein a first type of data transaction requests is contra-sided to a second type of data transaction requests;

receiving data transaction requests for processing by the computer system, the data transaction requests including at least a first data transaction request that is of the first type of data transaction requests;

determining whether the first data transaction request is matchable against any other data transaction requests that are pending within the data structure and contra-sided to the first data transaction request;

based on determination that the first data transaction request is matchable:
  starting a timer for a time period,
  locking the first type of transaction requests from processing against the data structure while the timer is active, and
  adding the first data transaction request to a queue, while the timer is active and has yet to expire, process subsequently received data transaction requests that are of the first type and add those subsequently received data transaction requests to the queue; and as a result of expiration of the timer for the time period, unlocking the first type of transaction requests to process against the data structure and process data transaction requests that are included in the queue against a current state of the data structure.

13. The method of claim 12, further comprising:

executing a matching engine computer process and a locking computer process, wherein determining whether the first data transaction request is matchable against any other data transaction requests that are pending within the data structure and contra-sided to the first data transaction request is handled by the matching engine computer process, wherein the timer for the time period is handled by the locking computer process.

14. The method of claim 13, wherein the matching engine computer process and the locking computer process are separate computer processes that are executed on the same computing device.

15. The method of claim 12, further comprising:

receiving a second data transaction request that is of the first type of data transaction requests; and based on the first type of transaction requests being locked from processing against the data structure, adding the second data transaction request to the queue.

16. The method of claim 15, wherein the second data transaction request is not matchable when added to the queue.

17. The method of claim 15, wherein the second data transaction request is a request to modify an existing data transaction request that is already stored in the data structure.

18. The method of claim 15, further comprising:

receiving a third data transaction request that is of the first type of data transaction requests; and while, the first type of transaction requests are locked from processing against the data structure and determination that the third data transaction request is a request to cancel an existing data transaction request that is already stored in the data structure, cancelling the existing data transaction request prior to unlocking of the type of transaction requests from processing.

19. The method of claim 12, further comprising receiving, after the first data transaction request is received and while the first type of transaction requests is locked from processing against the data structure, a second data transaction request that is of the second type of data transaction requests, wherein the second data transaction request is a request to modify an existing data transaction request that is stored in the data structure; and prior to processing the first data transaction request upon unlocking, modifying at least one value of the existing data transaction request by processing the second data transaction request, wherein, upon unlocking the first type of transaction requests to process against the data structure, matching the first data transaction request to the existing data transaction request for which the at least one value was modified.

20. A non-transitory computer readable storage medium storing a computer executable instructions for use with a computer system, the stored instructions comprising instructions that cause the computer system to:

store, to electronic memory of the computer system, a data structure that includes at least two different types of data transaction requests, wherein a first type of data transaction requests is contra-sided to a second type of data transaction requests;

receive data transaction requests, the data transaction requests including a first data transaction request that is of the first type of data transaction requests;

determine whether the first data transaction request is matchable against any other data transaction requests that are pending within the data structure and contra-sided to the first data transaction request;

based on determination that the first data transaction request is matchable:
- initiate a timer for a time period,
- lock the first type of transaction requests from processing against the data structure while the timer is active, and
- store the first data transaction request to a queue, while the timer is active and has yet to expire, process subsequently received data transaction requests that are of the first type and add those subsequently received data transaction requests to the queue; and as a result of expiration of the timer for the time period, unlock the first type of transaction requests to process against the data structure and process data transaction requests that are included in the queue against a current state of the data structure.

* * * * *